US012692895B2

(12) United States Patent
Khot et al.

(10) Patent No.: US 12,692,895 B2
(45) Date of Patent: Jul. 28, 2026

(54) CHANNEL NUT HOLDER WITH POLYMER HOUSING

(71) Applicant: EATON INTELLIGENT POWER LIMITED, Dublin (IE)

(72) Inventors: Vishal Khot, Pune (IN); Dinkar Benake, Pune (IN); Vedant Hule, Pune (IN); Veerangowda Patil, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 103 days.

(21) Appl. No.: 18/231,269

(22) Filed: Aug. 8, 2023

(65) Prior Publication Data

US 2024/0052873 A1 Feb. 15, 2024

(30) Foreign Application Priority Data

Aug. 9, 2022 (IN) .............................. 202211045397

(51) Int. Cl.
*F16B 37/04* (2006.01)

(52) U.S. Cl.
CPC .................................. *F16B 37/046* (2013.01)

(58) Field of Classification Search
CPC .............................. F16B 37/046; F16B 37/044
USPC .......................................................... 411/85
See application file for complete search history.

(56) References Cited

U.S. PATENT DOCUMENTS

| | | | | | |
|---|---|---|---|---|---|
| 3,785,421 | A | * | 1/1974 | Launay ................. | F16B 37/044 |
| | | | | | 411/908 |
| 4,531,870 | A | * | 7/1985 | Moryl ................... | F16B 37/042 |
| | | | | | 24/453 |
| 4,666,355 | A | * | 5/1987 | Stover ................... | F16B 37/046 |
| | | | | | 411/432 |
| 4,840,525 | A | * | 6/1989 | Rebentisch ........... | F16B 37/045 |
| | | | | | 403/348 |
| 5,628,598 | A | * | 5/1997 | Hofle .................... | F16B 37/045 |
| | | | | | 411/432 |
| 6,872,038 | B2 | | 3/2005 | Westlake | |
| 8,132,992 | B2 | * | 3/2012 | Van Walraven ...... | F16B 37/046 |
| | | | | | 411/84 |
| 8,833,040 | B2 | * | 9/2014 | Van Walraven ......... | E04C 3/07 |
| | | | | | 52/843 |
| 9,194,418 | B2 | * | 11/2015 | Parthibhan ............ | F16B 37/046 |
| 9,233,459 | B2 | | 1/2016 | Olson | |

(Continued)

FOREIGN PATENT DOCUMENTS

| | | |
|---|---|---|
| CN | 104847771 | 8/2015 |
| CN | 107429724 | 12/2017 |

(Continued)

OTHER PUBLICATIONS

Office Action & Search Report; Corresponding CN Application No. 202310995716.9; Examiner Xu Yangyang; Apr. 21, 2026.

*Primary Examiner* — Flemming Saether
(74) *Attorney, Agent, or Firm* — Squire Patton Boggs (US) LLP

(57) ABSTRACT

A channel nut holder includes a polymer body having a central axis, top surface, plurality of side surfaces, and a bottom surface. A channel nut opening is positioned between the side surfaces. The channel nut opening is configured to receive a channel nut. The channel nut holder further includes a spring back mechanism having a plurality of gripping flaps disposed on the top surface at an acute angle alpha ($\alpha$) with respect to the central axis.

18 Claims, 11 Drawing Sheets

(56)     References Cited

U.S. PATENT DOCUMENTS

| | | | | |
|---|---|---|---|---|
| 10,408,252 | B2 | 9/2019 | Raymond | |
| 11,378,113 | B2 * | 7/2022 | Juzak ...................... | F16B 7/187 |
| 11,661,962 | B2 * | 5/2023 | Müller ...................... | F16B 5/02 |
| | | | | 403/343 |
| 11,781,585 | B2 * | 10/2023 | Nijdam ................. | F16B 37/046 |
| | | | | 411/349 |
| 2003/0185643 | A1 * | 10/2003 | Thompson ............ | F16B 37/046 |
| | | | | 411/85 |
| 2024/0167498 | A1 * | 5/2024 | Nijdam ................... | F16B 7/187 |

FOREIGN PATENT DOCUMENTS

| | | | | |
|---|---|---|---|---|
| CN | 107636324 | 1/2018 | | |
| CN | 213393088 | 6/2021 | | |
| CN | 113464539 | 10/2021 | | |
| DE | 19821255 A1 * | 11/1999 | ........... | F16B 37/046 |
| EP | 3586013 | 1/2020 | | |
| EP | 3916248 | 12/2021 | | |

* cited by examiner

CHANNEL NUT HOLDER WITH POLYMER HOUSING

CROSS REFERENCE TO RELATED APPLICATION

This application claims priority to Indian Provisional Patent Application No. 202211045397, filed on Aug. 9, 2022, the disclosure of which is incorporated herein by reference in its entirety.

FIELD OF INVENTION

The present disclosure relates to the field of channel nuts for use with structural channels. More particularly, the present disclosure relates to a channel nut holder with a polymer housing.

BACKGROUND

Generally, channel twirl nuts are made of metal housings that are costly compared to housings using polymeric material. Previous attempts at making channel nut holders of polymeric materials, however, were known to have issues with slipping when placed in a strut of a channel framing system that is oriented vertically.

Furthermore, existing channel spring nuts use different springs to correspond to different channel heights. In addition, the channel nut used for a channel spring nut can have different thicknesses. The various combinations of spring heights and channel nut thickness need to be maintained in order to prevent inadvertently mixing parts. Such maintenance procedures consume labor time, space for organizing the various combinations of parts, and maintenance documentation.

Therefore, it is desirable to provide a channel nut and holder assembly where the holder has a polymer housing and a spring back mechanism. Such an assembly reduces the cost of a channel twirl nut without adversely impacting the hold of the channel twirl nut when secured on a strut of a channel framing system oriented vertically.

It is also desirable to provide a channel nut holder where the holder has a polymer housing and is configured to assemble with channel nuts of various thicknesses. Therefore, the need for various different springs for different channel heights and channel twirl nuts for various channel nut thicknesses can be eliminated.

SUMMARY OF THE INVENTION

In one embodiment, a channel nut holder includes a polymer body having a central axis, top surface, plurality of side surfaces, and a bottom surface. A channel nut opening is positioned between the side surfaces. The channel nut opening is configured to receive a channel nut. The channel nut holder further includes a spring back mechanism having a plurality of gripping flaps disposed on the top surface at an acute angle alpha ($\alpha$) with respect to the central axis.

In another embodiment, a channel nut and holder assembly includes a channel nut and a channel nut holder. The channel nut holder includes a polymer body having a central axis, top surface, plurality of side surfaces, and a bottom surface. A channel nut opening is positioned between the side surfaces. A channel nut is inserted into the channel opening. The channel nut holder further includes a spring back mechanism having a plurality of gripping flaps disposed on the top surface at an acute angle alpha ($\alpha$) with respect to the central axis.

In yet another embodiment, a channel nut holder includes a polymer body having a central axis, a top surface, a flexible strap, and a side surface. The flexible strap extends distally from the top surface and includes a bolt opening, locking mechanism, and a distal end. The side surface includes a plurality of slots configured to receive the distal end of the flexible strap. The slots correspond to channel nut with various thicknesses assembled with the channel nut holder.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figures 1A, 1B, 1C, 2, 3:
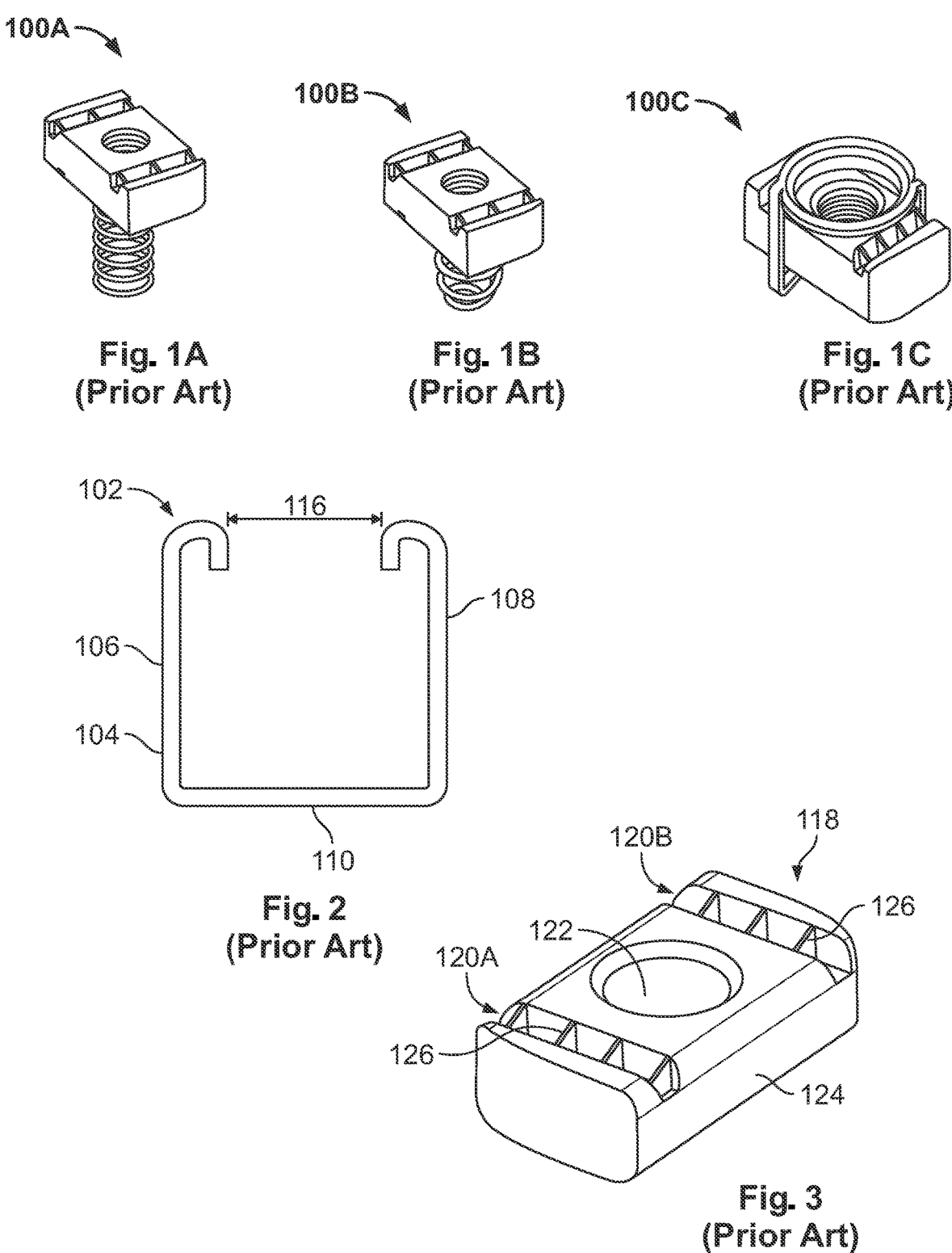
FIGS. 1A-C are perspective views of prior art channel spring nuts and a prior art channel twirl nut.
FIG. 2 is a schematic drawing of the front view of a prior art strut of a channel framing system.
FIG. 3 is a perspective view of another prior art channel nut.

FIGS. 1A-C illustrate prior art channel nuts for use with a channel framing system. Channel spring nut 100A and channel spring nut 100B are configured to be inserted laterally into a channel slot of the channel framing system by compressing the spring. Channel spring nuts 100A, 100B may be engaged in the channel by rotating the channel spring nut ninety degrees in the channel slot and allowing the spring to expand. Channel spring nuts 100A, 100B include parallel channels configured to engage flanges of the channel. Channel spring nut 100A has a different spring height than channel spring nut 100B to correspond to different channel heights of different channel framing systems. Therefore, various springs with different heights are required to correspond with each channel height.

Channel twirl nut 100C typically includes a channel nut holder having a metal housing, including stainless steel, aluminum alloy, fiberglass, or other suitable materials. Channel twirl nut 100C is inserted laterally into the channel slot of the channel framing system and secured by turning the channel twirl nut ninety degrees in the channel slot. The use of a metal housing increases the cost of the channel twirl nut.

FIG. 2 is a schematic drawing of a conventional structural strut 102 used in a channel framing system. Channel 104 is substantially U-shaped and defined by sidewalls 106 and 108 and bottom wall 110. Strut 102 includes two inwardly turned flanges 112 and 114 configured to secure a channel nut inserted into channel 104. Channel 104 includes channel slot 116. Channel 104 has a channel height. The combined height of the body and the spring of channel spring nuts 100A, 100B needs to be greater than the channel height in order for channel spring nuts 100A, 100B to exert a sufficient upward spring force to secure channel spring nuts 100A, 100B into channel 104.

FIG. 3 illustrates another exemplary prior art channel nut. Channel nut 118 includes channel 120A and channel 120B. Channels 120A, 120B are configured to engage the rails of a channel framing system, for example strut 102 shown in FIG. 2. A plurality of teeth 126 are disposed in channels 120A, 120B to further facilitate the frictional engagement with the rails of a channel framing system. Channel nut 118 further includes threaded opening 122 configured to receive a bolt or screw. Threaded opening 122 extends through channel nut 118 and is configured to secure parts to a channel framing system once installed. Channel nut 118 is generally made of metal and comes in various thicknesses, for example 0.25 inches, 0.325 inches, or 0.50 inches. Channel nut 118 can further include a groove (not shown) on surface 124. The groove can be used to secure a channel holder with a corresponding rib to the channel nut.

Figures 4, 5:
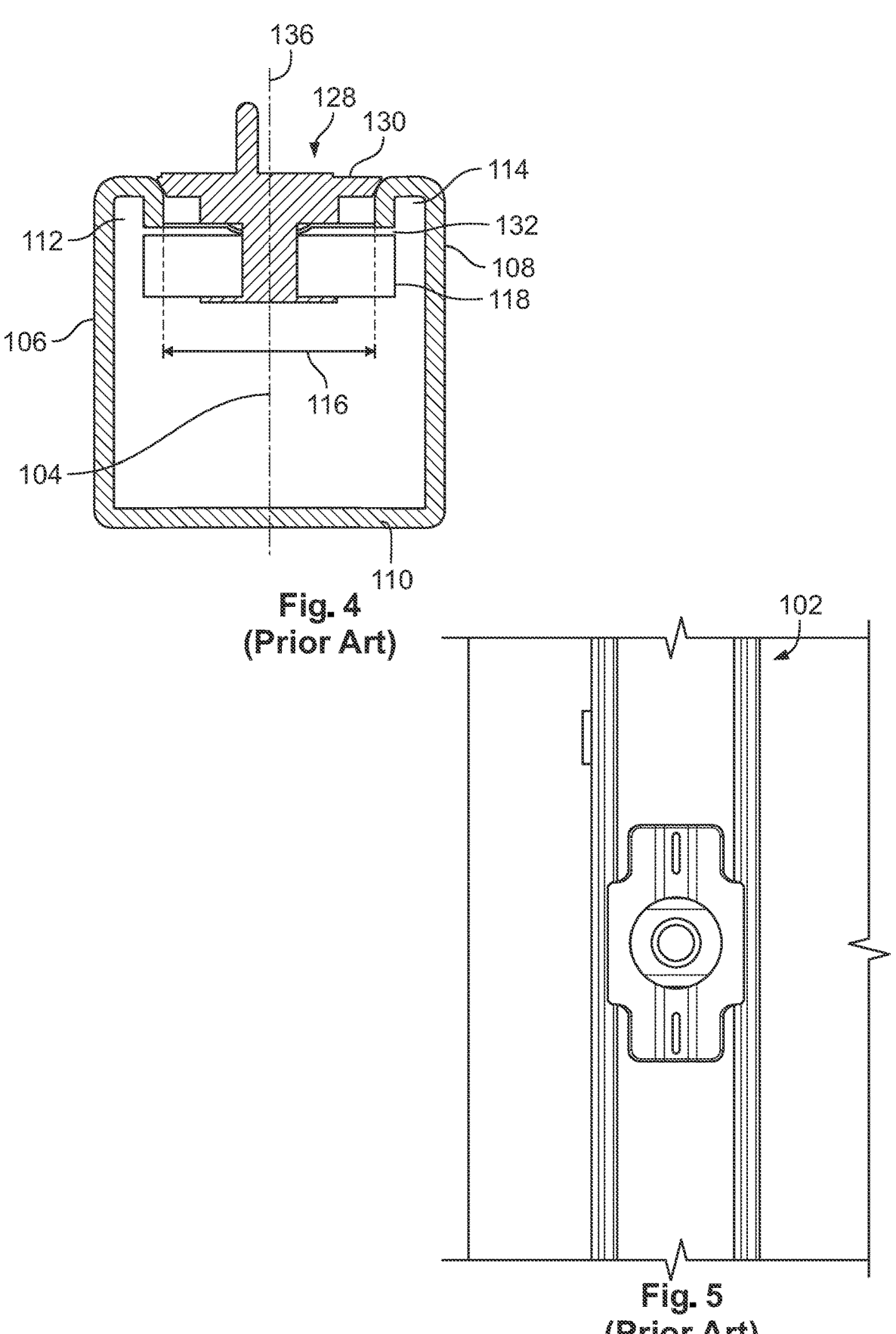
FIG. 4 is a perspective view of yet another prior art channel nut and holder assembly inserted into a strut.
FIG. 5 is a front view of the prior art channel nut and holder assembly shown in FIG. 4.

FIG. 4 and FIG. 5 depict a prior art channel nut and holder assembly where the holder has a polymer housing inserted into a strut of a channel framing system positioned vertically.

Channel nut assembly 128 comprises channel nut 118 and channel nut holder 130. Channel nut 118 is substantially similar to the prior art channel nut shown in FIG. 3. Channel nut assembly 128 is inserted into channel 104 of strut 102. Strut 102 is substantially similar to the schematic drawing of the conventional structural strut shown in FIG. 2. Channel 104 is substantially U-shaped and defined by sidewalls 106 and 108 and bottom wall 110. Channel nut assembly 128 is inserted laterally into a channel slot 116 and secured into strut 102 by turning channel nut assembly 128 ninety degrees within channel 104. As shown in FIG. 4, however, there can be a gap 132 between channel 120A of channel nut 118 and flange 114 of channel 102. As a result, when strut 102 is positioned vertically, channel nut assembly 128 can slide shown strut 102.

Figure 6A:
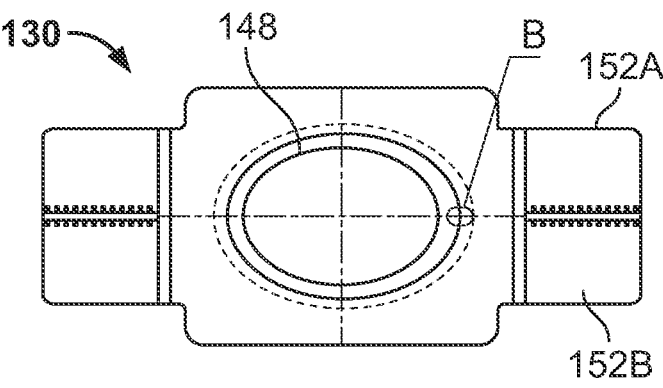
FIG. 6A is a top view of a prior art channel nut holder.
Figure 6B:
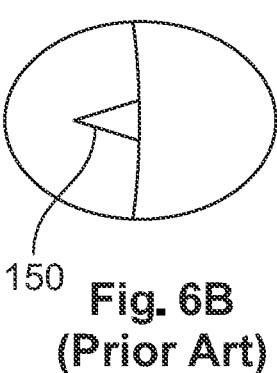
FIG. 6B is a top view of the rib of a prior art channel nut holder.
Figure 7:
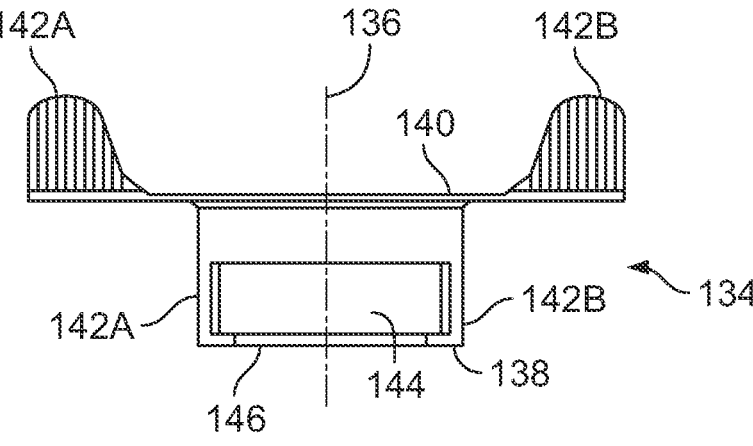
FIG. 7 is a front view of the prior art channel nut holder shown in FIG. 6A.

FIG. 6A, FIG. 6B, and FIG. 7 depict a channel nut holder where the holder has a polymer housing shown in FIG. 4 and FIG. 5.

Channel holder 130 includes polymer body 134 having central axis 136, bottom surface 138 and top surface 140. Polymer body 134 further includes side surface 142A and side surface 142B positioned between bottom surface 138 and top surface 140. In one embodiment, polymer body 134 is made of nylon, but it should be understood that other polymer materials may be chosen.

Channel nut holder 130 further includes channel nut opening 144 positioned between side surfaces 142A, 142B. Channel nut opening 144 is configured to receive a channel nut, for example channel nut 118 shown in FIG. 4. Bottom surface 138 and top surface 140 include opening 146 and opening 148, respectively. Opening 146 and opening 148 are configured to allow access to a threaded opening of the channel nut inserted into channel nut opening 144. In this example, the diameter of openings 146, 148 is approximately 19.5 mm. The material thickness of side surfaces 142A, 142B around channel nut opening 144 is approximately 1 mm. Side surfaces 142A, 142B each include rib 150 in the manner shown in FIG. 6B. Rib 150 extends along the height of channel nut opening 144 and is configured to couple to a corresponding groove of a channel nut inserted into channel nut opening 144. In this example, the material thickness of rib 150 is 0.5 mm.

Top surface 140 includes gripping flap 152A and gripping flap 152B each extending away from a middle portion of top surface 140. Top surface 140 and gripping flaps 152A, 152B are perpendicular to central axis 136. Top surface 140 further includes finger grip 154A and finger grip 154B, respectively. Finger grips 154A, 154B are configured to assist a user with manually rotating a channel nut assembly that includes channel nut holder 130. In this example, the material thickness of top surface 140 is 0.6 mm. The first width top surface 140 is 20 mm and a second width of top surface 140 is 30 mm. The first width is configured to be slightly less than the width of the channel slot that channel nut holder 130 is inserted into. The second width is greater than the width of the channel slot that channel nut holder 130 is inserted into. In this example the length of top surface 140 is 50 mm.

Top surface 140 is generally positioned flat on top of the strut of a channel framing system in the manner shown in FIG. 4. As shown in FIG. 4, this can result in a gap between the channel nut inserted into channel nut holder and the flanges of the strut. As a result, when the strut is positioned vertically, the channel nut inserted into channel nut holder 130 can slide shown the strut. Therefore, it is desirable to provide a channel nut and holder assembly where the holder has a polymer housing without adversely impacting the hold of the assembly in a vertical position.

Figure 8:
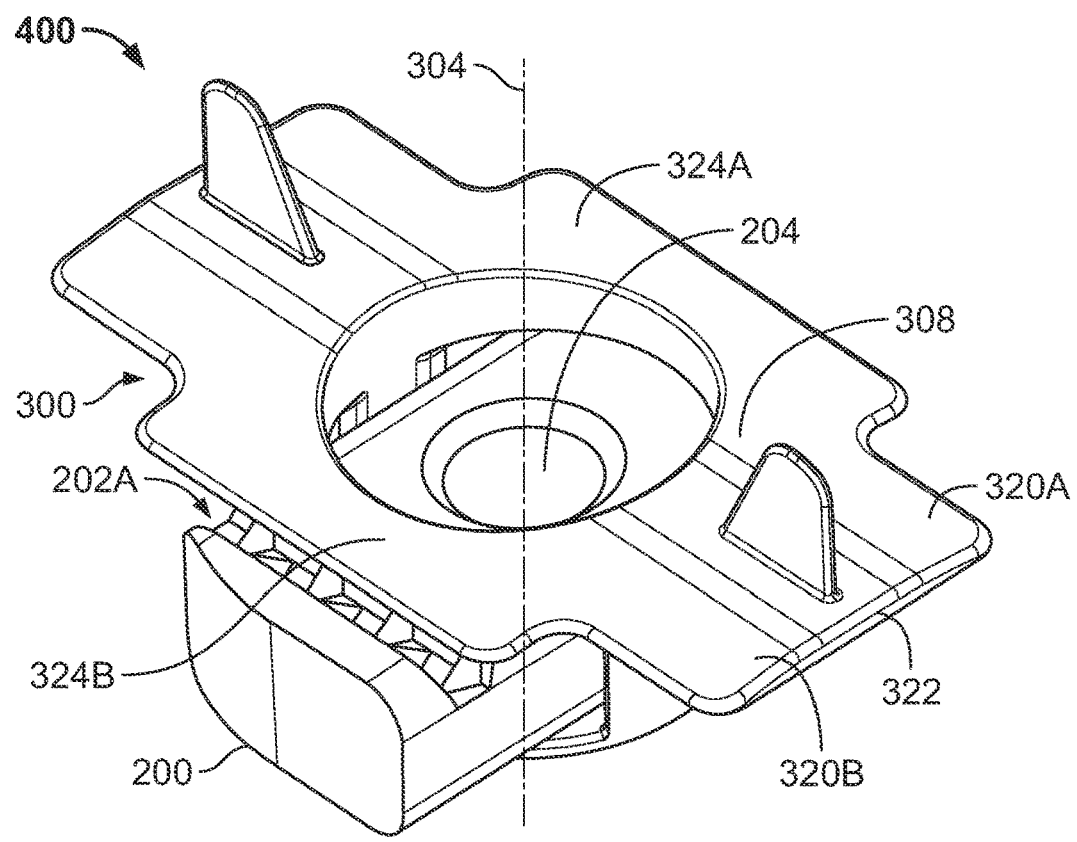
FIG. 8 is a perspective view of one embodiment of a channel nut holder holding a channel nut.
Figure 9:
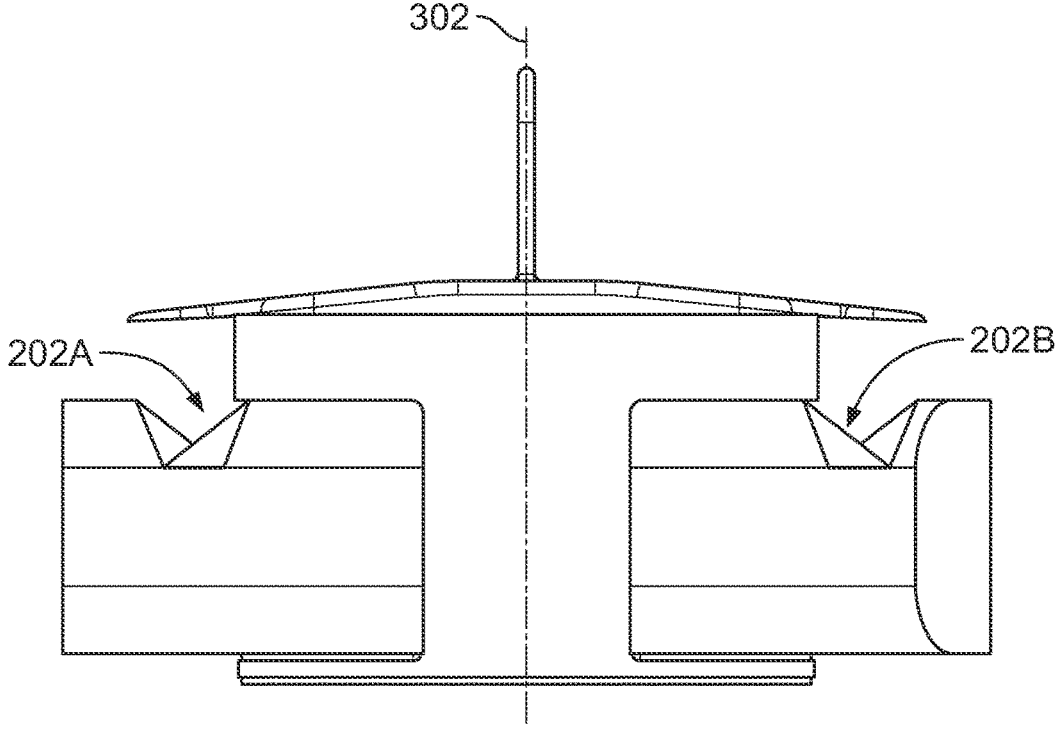
FIG. 9 is a front view of the channel nut holder shown in FIG. 8.

FIG. 8 and FIG. 9 depict an embodiment of channel nut and holder assembly where the holder has a polymer housing and a spring back mechanism. Such an assembly reduces the cost of a channel twirl nut without adversely impacting the hold of the channel twirl nut when secured on a strut of a channel framing system positioned vertically.

Channel nut assembly 400 comprises channel nut 200 and channel nut holder 300. Channel nut 200 is inserted into channel nut holder 300 in the manner shown in FIG. 8. Channel nut 200 is similar to the prior art channel nut shown in FIG. 3. Channel nut 200 includes channel 202A and channel 202B. Channels 202A, 202B are configured to engage the flanges of a channel framing system, for example strut 102 shown in FIG. 2. Channel nut 200 includes threaded opening 204 configured to receive a bolt or screw. Threaded opening 204 extends through channel nut 200 and is configured to secure parts to a channel framing system once installed.

FIG. 10, FIG. 11, FIG. 12, and FIG. 13, depict a channel nut holder where the holder has a polymer housing and spring back mechanism shown in FIG. 8 and FIG. 9.

Figure 10:
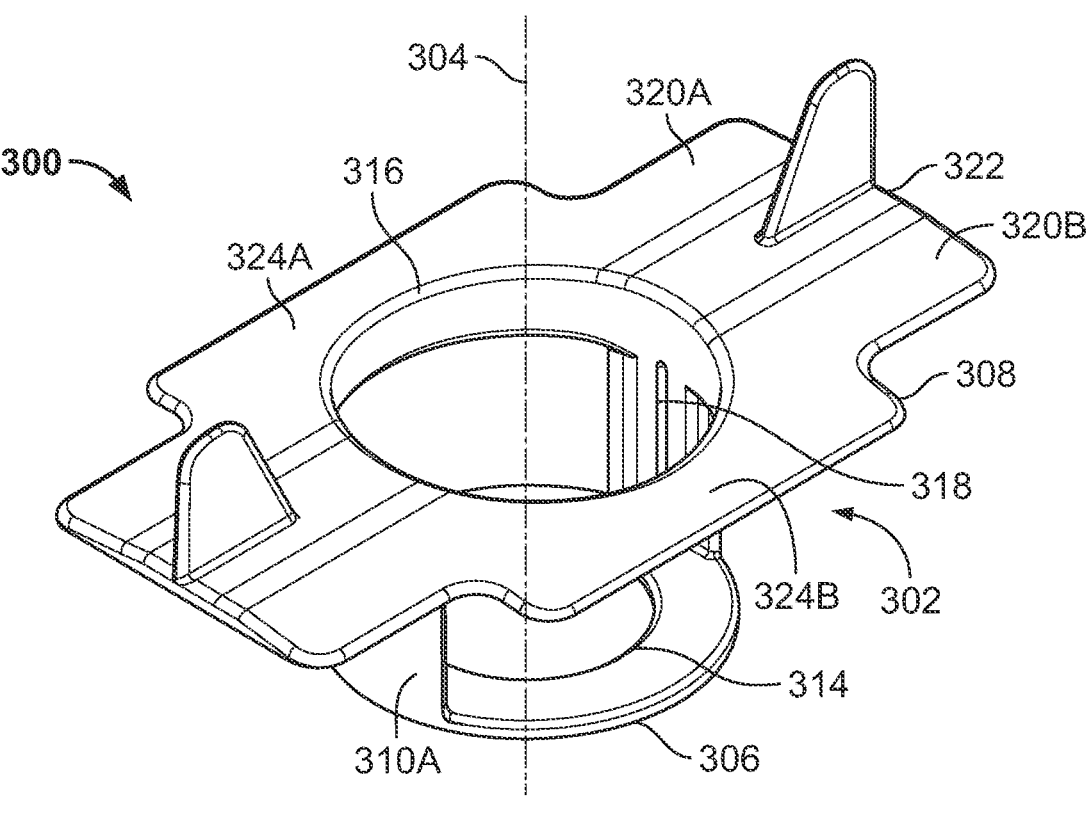
FIG. 10 is a perspective view of the channel nut holder shown in FIG. 8.

FIG. 10 illustrates channel holder 300 including polymer body 302 having central axis 304, bottom surface 306, and top surface 308. Polymer body 302 further includes first side surface 310A and second side surface 310B positioned between bottom surface 306 and top surface 308. Polymer body 302 is made of nylon, but it is understood that other polymer materials may be chosen.

Figure 11:
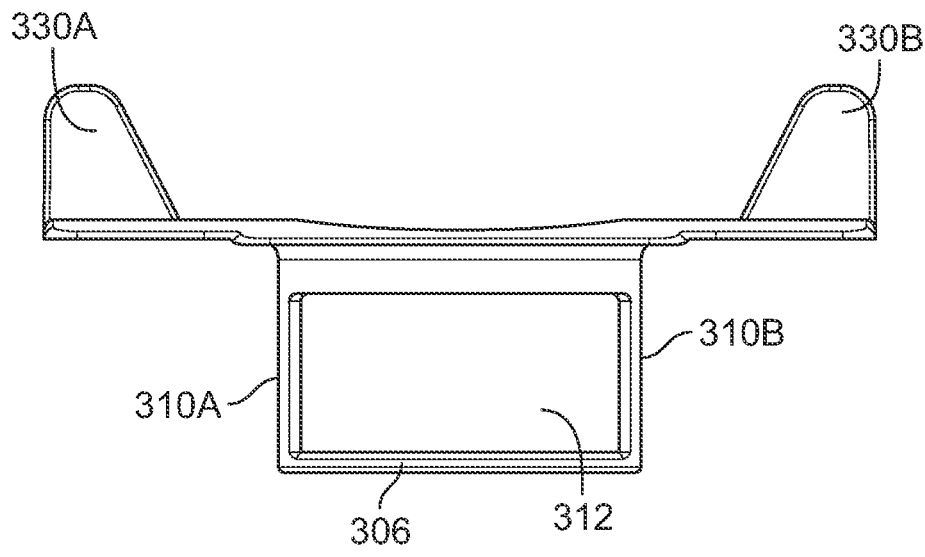
FIG. 11 is a side view of the channel nut holder shown in FIG. 8.
Figure 12:
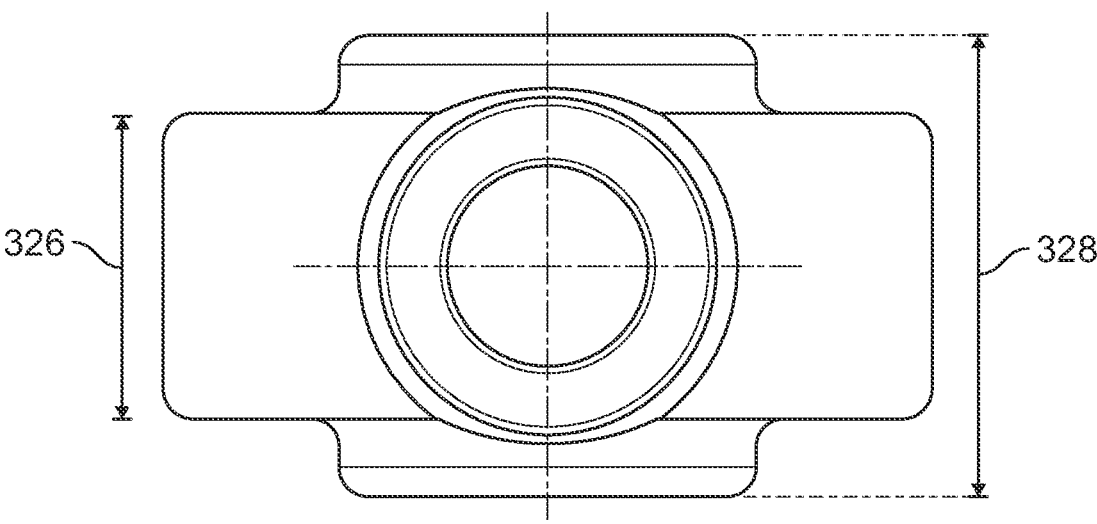
FIG. 12 is a top view of the channel nut holder shown in FIG. 8.
Figure 13:
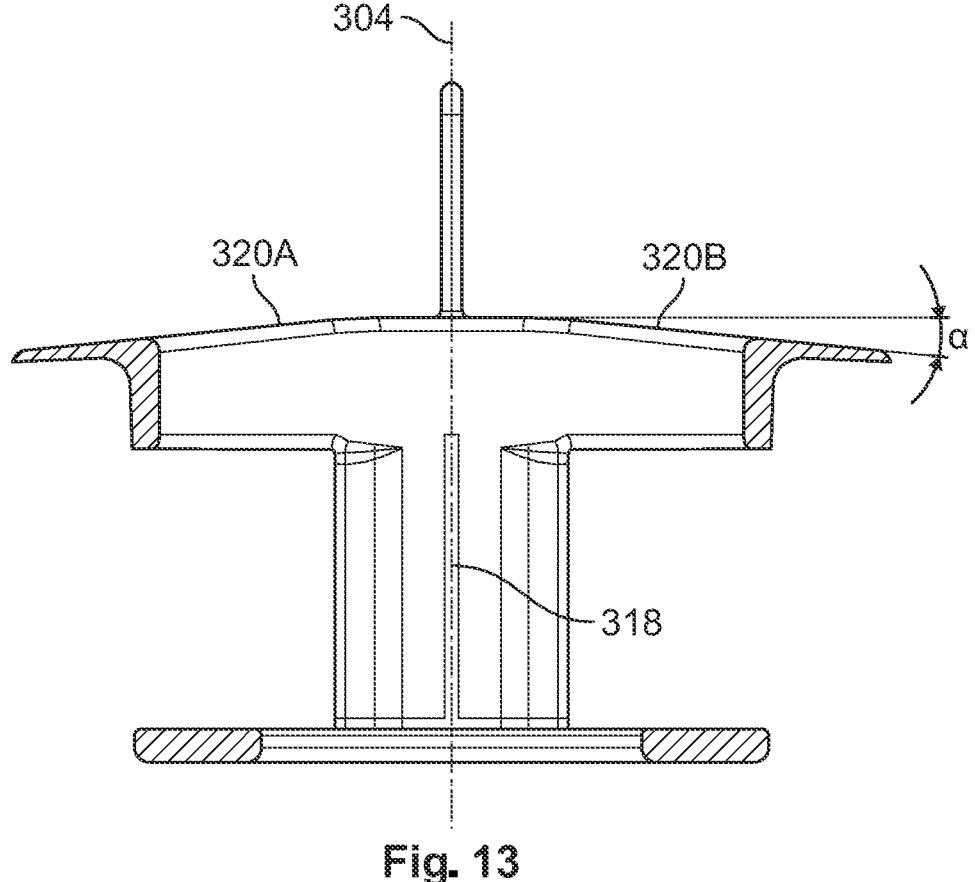
FIG. 13 is a cross-sectional view of the channel nut holder shown in FIG. 8.

Channel nut holder 300 further includes channel nut opening 312 positioned between side surfaces 310A, 310B. Channel nut opening 312 is configured to receive a channel nut, for example channel nut 200 shown in FIG. 8. Bottom surface 306 and top surface 308 include opening 314 and opening 316, respectively. Opening 314 and opening 316 are configured to allow access to threaded opening 204 of channel nut 200 inserted into channel nut opening 312 in the manner shown in FIG. 8. Side surfaces 310A, 310B each include rib 318 in the manner shown in FIG. 10 and FIG. 11. Rib 318 extends along the height of channel nut opening 312 and is configured to couple to a corresponding groove (not shown) of channel nut 200 inserted into channel nut opening 312. As shown in FIG. 11, the height of rib 318 is 9.53 mm. In other embodiments, the height of rib 318 is between 6.33 mm to 12.73 mm depending on the thickness of channel nut 200.

Top surface 308 includes first gripping flap 320A and second gripping flap 320B, each extending away from middle portion 322 of top surface 308. Gripping flaps 320A, 320B extend the length of top surface 308 and include first tab 324A and second tab 324B, respectively. In this example, the length of top surface 308 is 50 mm. In other embodiments, the length is between 40-60 mm. Top surface 308 includes first width 326 and second width 328. First width 326 is slightly less than the width of the channel slot that channel nut holder 130 is inserted into. Second width 328 is greater than the width of the channel slot that channel nut holder 130 is inserted into. As a result, tabs 324A, 324B are positioned on top of the strut of a channel framing system. In this example, second width 328 is 30 mm. In other embodiments, the second width is between 20-40 mm.

Channel nut holder 300 includes a spring-back mechanism to secure the channel nut inserted into. In this embodiment, gripping flaps 320A, 320B are at acute angle alpha (α) with respect to central axis 304 in the manner show in FIG. 13. As a result, gripping flaps 320A, 320B apply a force to secure the channel nut inserted into channel nut holder 300 to the strut of the channel framing system. This upward force removes any gap, such as the gap caused by the prior art channel holder including polymer body with a flat top surface shown in FIG. 4. In this example, acute angle (α) is six degrees. The acute angle (α) can also be an angle between six degrees and ten degrees without departing from the broad principals disclosed herein.

First finger grip 330A and second finger grip 330B are disposed on top surface 308. Finger grips 330A, 330B are configured to assist a user with manually rotating a channel nut assembly that includes channel nut holder 300. In this example, the material thickness of top surface 308 is 0.5 mm. In other embodiments, the thickness is between 0.1-1.0 mm.

Figures 14, 15, 16:
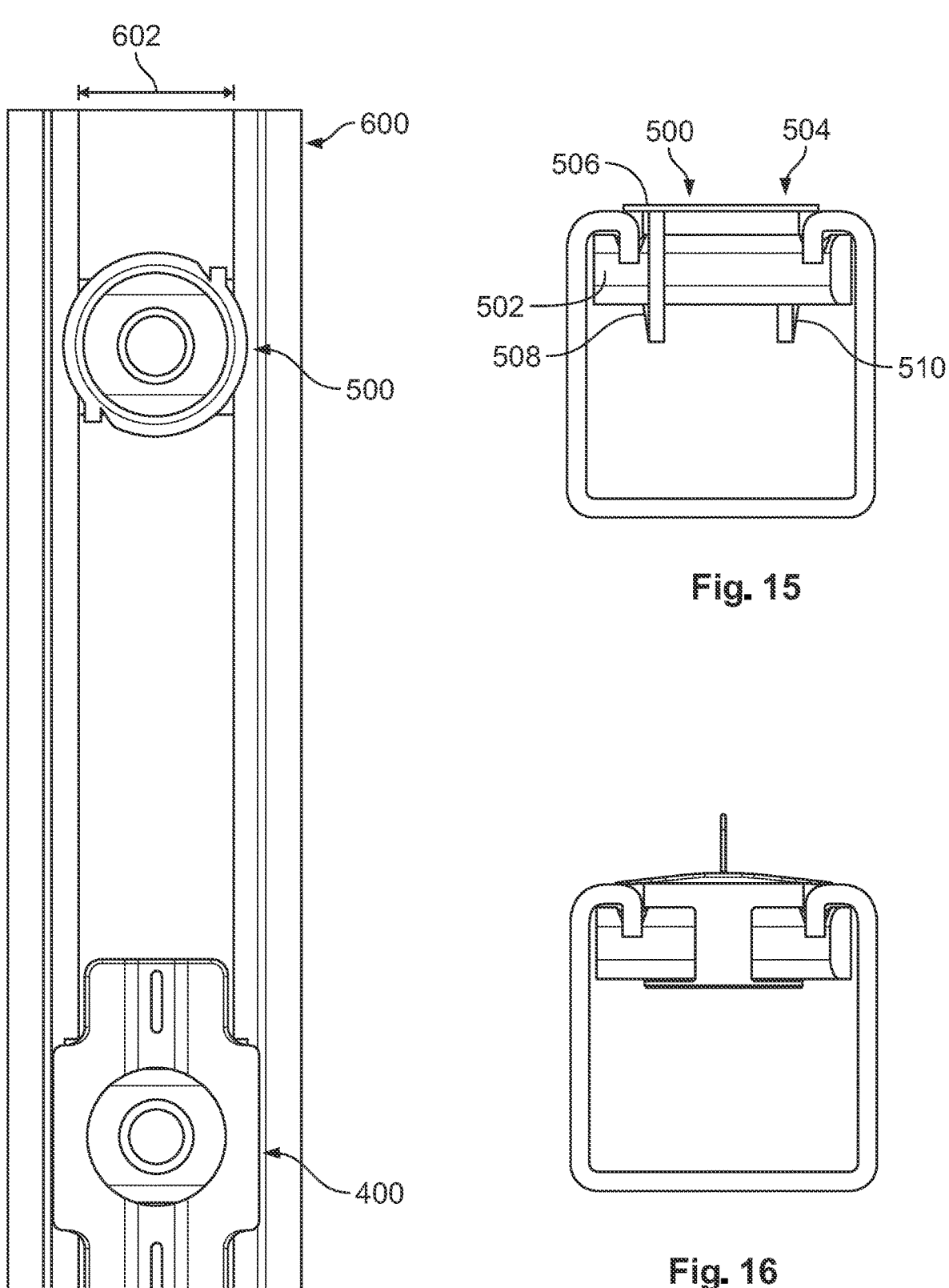
FIG. 14 is a front view of a prior art channel twirl nut and the channel nut holder shown in FIG. 8 secured on a strut of a channel framing system positioned vertically.
FIG. 15 is a view of the prior art channel twirl nut shown in FIG. 14 secured on a strut of a channel framing system positioned vertically.
FIG. 16 is a view of the channel nut holder shown in FIG. 8 secured on a strut positioned vertically of a channel framing system.

FIG. 14, FIG. 15, and FIG. 16 depict a prior art channel twirl nut and the channel nut assembly shown in FIG. 8 secured on a strut of a channel framing system positioned vertically.

Channel twirl nut 500 is substantially similar to the prior art channel twirl nut shown in FIG. 1. Channel twirl nut 500 includes channel nut 502 and housing 504. Housing 502 includes top surface 506 and first arm 508 and second arm 510 extending from top surface 506. First arm 506 and second arm 510 are coupled to the bottom of channel nut 502. Channel nut 502 and housing 504 are formed of metal, thereby increasing the costs of parts for the channel framing system.

The process of securing channel twirl nut 500 into strut 600 begins with laterally inserting channel twirl nut 500 into channel slot 602 at the desired position along the length of strut 600. Channel twirl nut 500 is secured into strut 600 by rotating channel twirl nut 500 ninety degrees as shown in FIG. 14 and FIG. 15.

FIG. 16 illustrates some of the benefits of using channel nut assembly 400. The process of securing channel nut assembly 400 into strut 600 begins with inserting channel nut assembly 400 into channel slot 602 at the desired position. Channel nut assembly 400 is secured by rotating channel nut assembly 400 ninety degrees as shown in FIG. 14 and FIG. 16. The spring-back mechanism of channel nut holder 300, described in detail above with reference to FIG. 13, allows for cost reduction of a channel twirl nut by using a polymer housing without adversely impacting the hold of the channel twirl nut when secured on a strut positioned vertically. Furthermore, the use of a polymer housing instead of a metal housing can improve the ease of assembling a channel nut and channel nut holder.

Figures 17, 18:
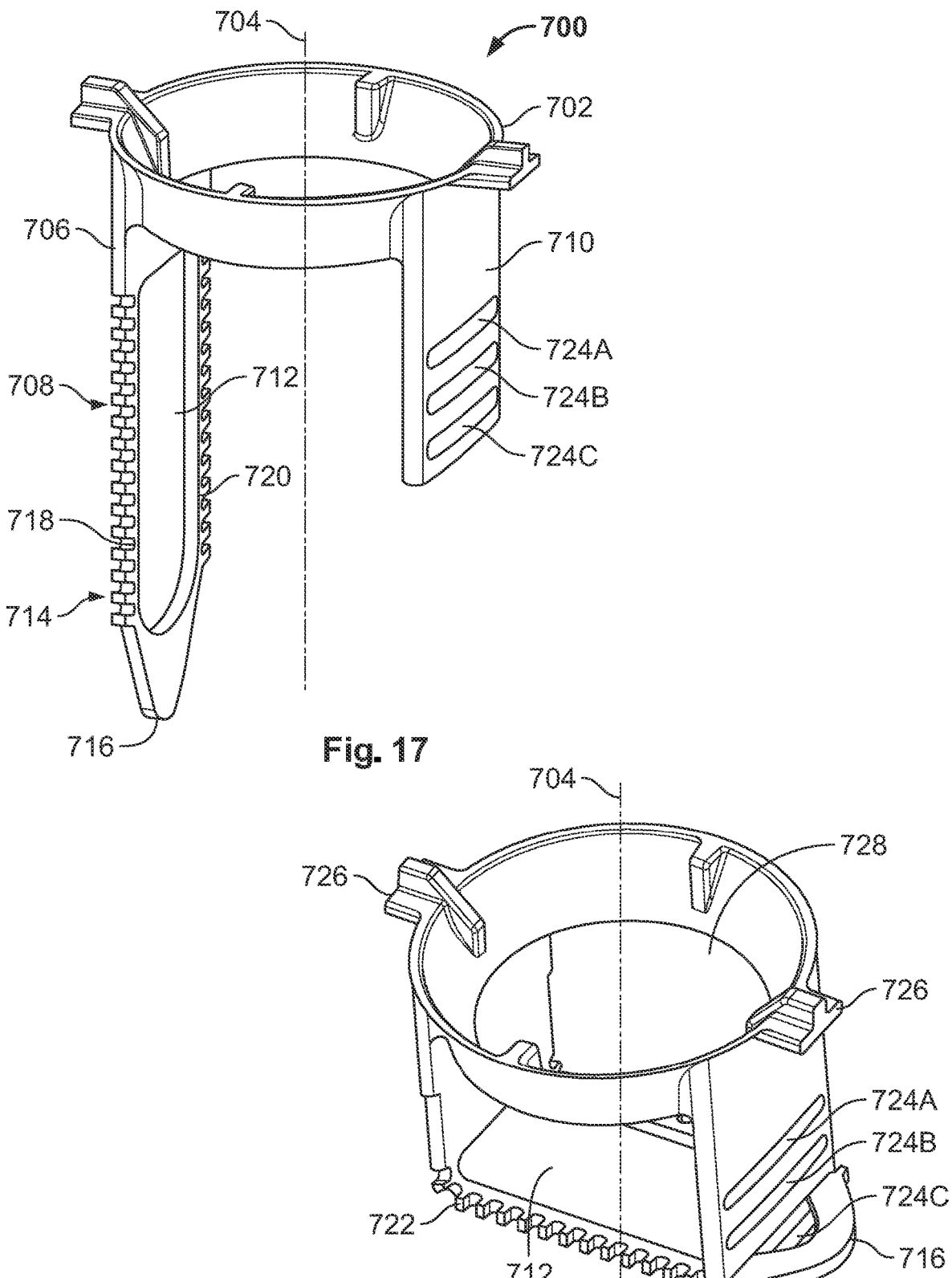
FIG. 17 is a perspective view of an alternative embodiment of channel nut holder in a first position.
FIG. 18 is a perspective view of the channel nut holder shown in FIG. 17 in a second position.

FIG. 17 and FIG. 18 depict another exemplary channel nut holder where the holder has a polymer housing and is configured to couple to channel nuts of various thicknesses. It is advantageous to have a single channel nut holder for various channel nuts, because it can eliminate the need for different springs for different channel heights. Furthermore, it can reduce the overall part count, thereby improving assembly ease and time. Furthermore, a polymer housing provides for cost-savings.

FIG. 17 illustrates channel holder 700 including polymer body 702 having central axis 704, top surface 706, flexible strap 708, and side surface 710. Polymer body 702 is made of nylon, but it is understood that other polymer materials may be chosen. Flexible strap 708 extends distally from top surface 706 and includes bolt opening 712, locking mechanism 714, and distal end 716. In this embodiment, locking mechanism 714 includes a plurality of locking teeth 722 positioned at first side 718 and second side 720 of flexible strap 708. Locking teeth 722 are configured to secure flexible strap 708 to a plurality of slots disposed on side surface 710.

Side surface 710 includes a plurality of slots 724A, 724B, and 724C in the manner shown in FIG. 17. In this example, slot 724A, slot 724B, and slot 724C are configured to secure channel nut holder 700 to a channel nut with a thickness of approximately 0.25 inches, 0.375 inches, and 0.50 inches, respectively. In alternative embodiments (not shown), the slots may be positioned to accommodate channel nuts of other thicknesses. While three slots are shown in the illustrated embodiment, it should be understood that other embodiments may have two slots or more than three slots.

A plurality of grips 726 are disposed on top surface 706. Grips 726 are configured to allow the griping and twisting of channel nut holder 700 during assembly. In this embodiment, top surface 706 is conical and includes opening 728.

Figure 19:
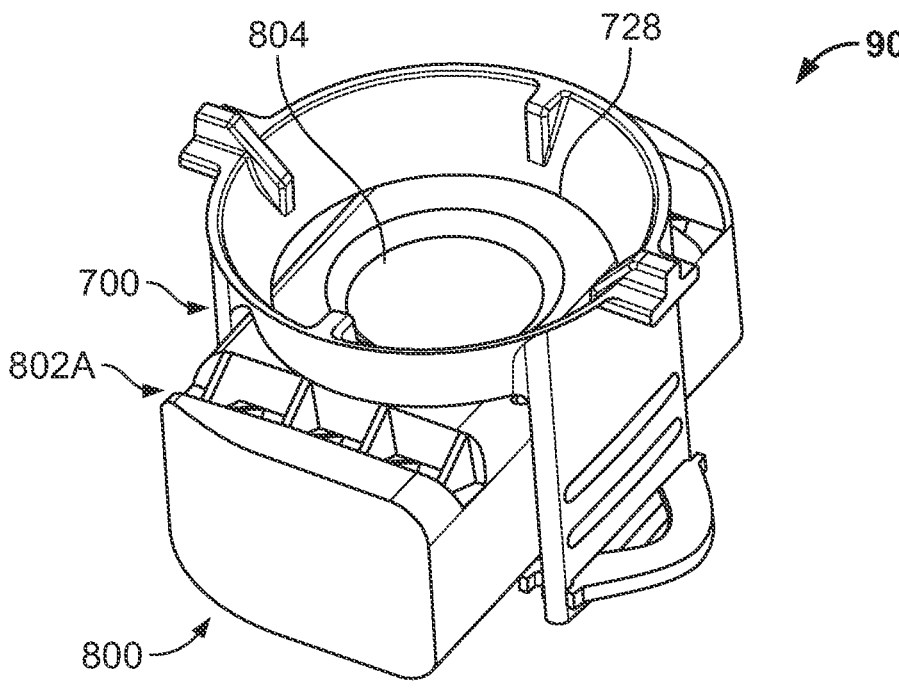
FIG. 19 is a perspective view of the channel nut holder shown in FIG. 17 holding a channel nut.

FIG. 18 illustrates channel nut holder 700 with flexible strap 708 inserted into slot 724C of side surface 710. FIG. 19 illustrates channel nut holder 700 coupled to channel nut 800.

Channel nut 800 is similar to the prior art channel nut shown in FIG. 3. Channel nut 800 includes channel 802A. Channel 802A is configured to engage the flanges of a channel framing system, for example strut 102 shown in FIG. 2. Channel nut 800 includes threaded opening 804 configured to receive a bolt or screw. Threaded opening 804 extends through channel nut 800 and is configured to secure parts to a channel framing system once installed.

The process of assembling channel nut assembly 900 begins with providing channel nut holder 700 in a disassembled state shown in FIG. 17. Next, channel nut 800 is provided. Channel nut holder 700 is position over channel nut 800 such that opening 728 and treaded opening 804 are aligned. Thereafter, flexible strap 708 is folded underneath channel nut 800 to define a bottom surface of channel nut holder 700. Bolt opening 712 is positioned on the bottom surface of channel nut holder 700.

Next, distal end 716 is inserted into a corresponding slot of side surface 710. In this example, the thickness of channel nut 800 is approximately 0.50 inches, so distal end 716 is inserted into slot 724C. Distal end 716 is pulled until locking teeth 722 secure flexible strap 708 to slot 724C. In an alternative embodiment, the flexible strap and side surface can include a rib configured to couple to a groove on a side surface of the channel nut.

Figure 20:
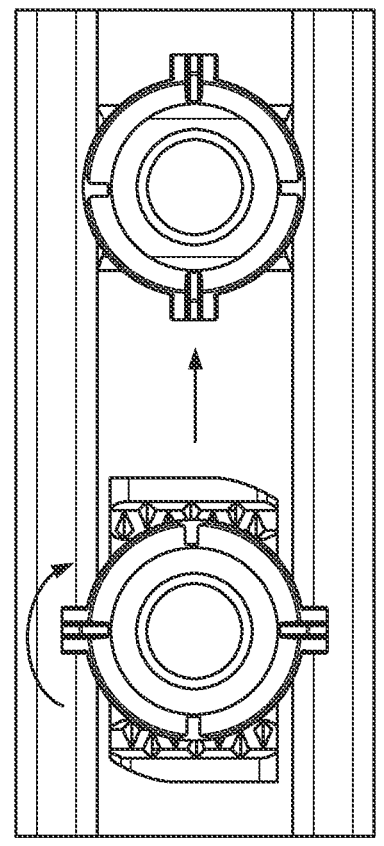
FIG. 20 is a front view of the channel nut holder shown in FIG. 17 secured on a strut of a channel framing system positioned vertically.

FIG. 20 illustrates the process of securing the assembled channel nut assembly 900 to a strut of a channel framing system. Channel nut assembly 900 is laterally inserted into a channel slot of the strut at the desired position along the length of the strut. Thereafter, channel nut assembly 900 is secured to the strut by rotating channel nut assembly 900 ninety degrees. Next, secure engagement of channel nut assembly 900 is confirmed to ensure that it will not freely fall while the strut is in a vertical position. This can be checked by attempting to move channel nut assembly 900. Once the secure engagement of channel nut assembly 900 is confirmed (including any necessary adjustments) it is ready for use to attached parts to threaded opening 804.

Figure 21:
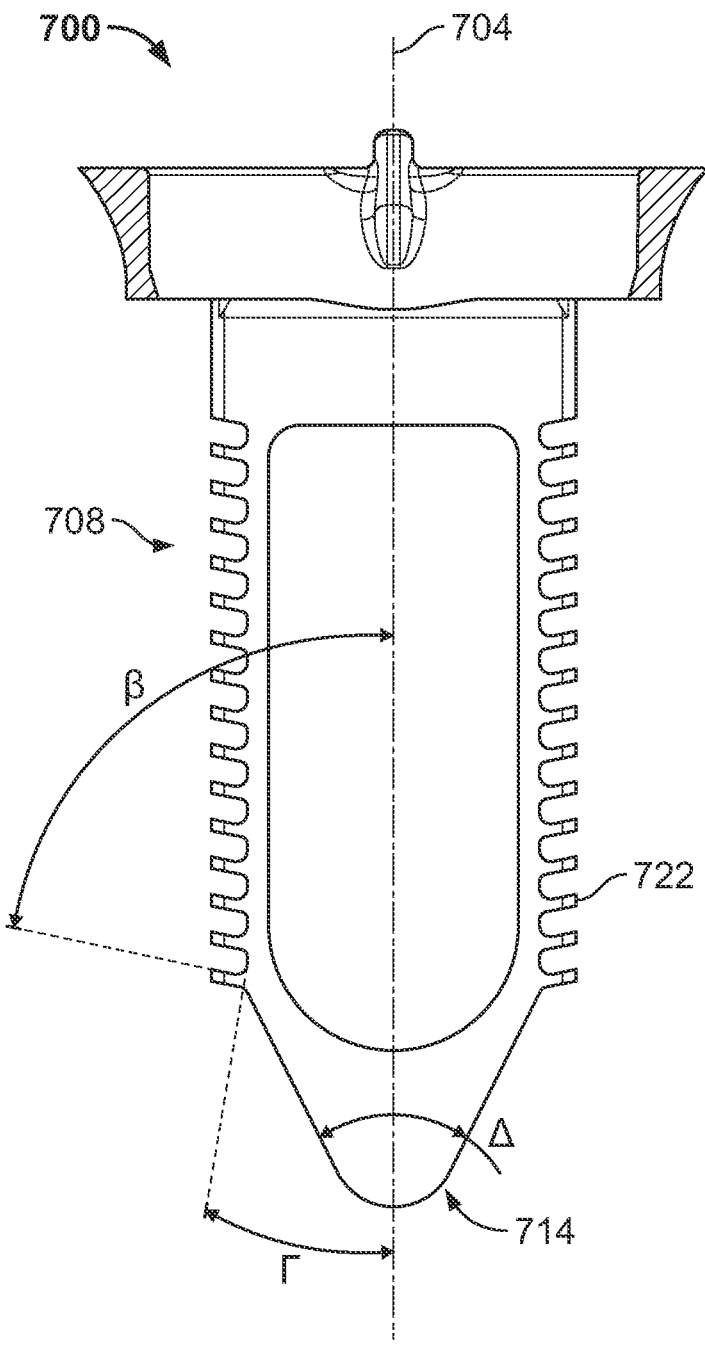
FIG. 21 is a schematic drawing of a side view of the channel nut holder shown in FIG. 17.
Figure 22:
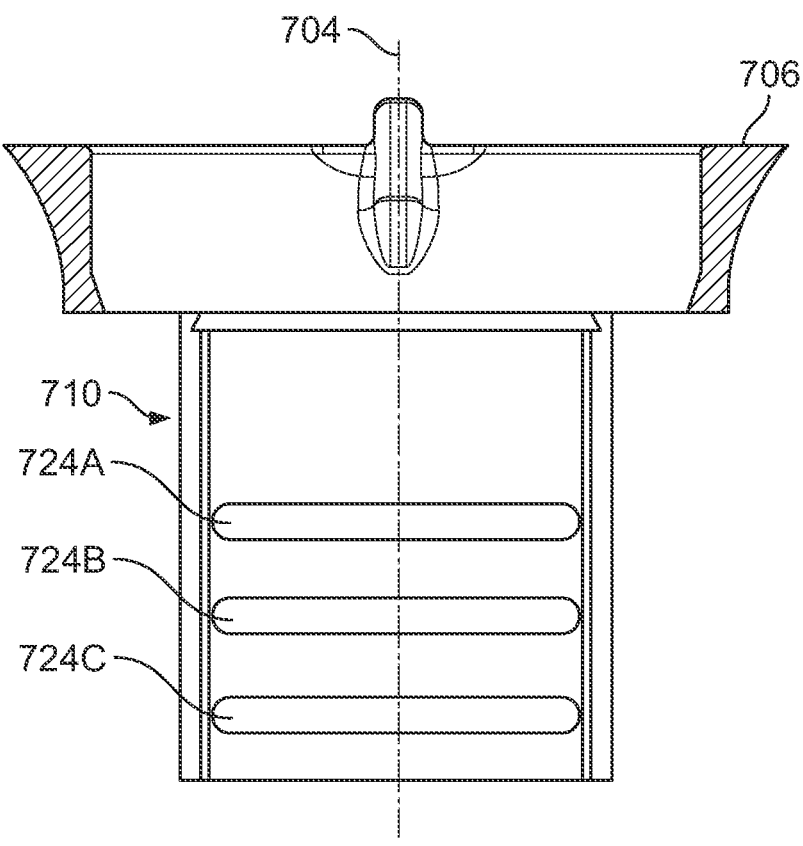
FIG. 22 is a schematic drawing of a side view of the channel nut holder shown in FIG. 18.

FIG. 21 and FIG. 22 are schematic drawings showing channel nut holder 700.

In one embodiment, the plurality of locking teeth 722 have a material thickness of 0.5 mm and are spaced 1.0 mm apart. In other embodiments, the plurality of locking teeth may have a material thickness between 0.1 mm and 1 mm and are spaced between 0.5 mm and 2 mm apart. The space between each locking tooth is configured to frictionally secure a material thickness of the side surface (not shown) of channel nut holder 700. Furthermore, locking teeth 722 are oriented at an acute angle beta (β) with respect to central axis 704. Acute angle beta (β) is configured to allow for inserting distal end 714 into a slot with minimal force, and frictional preventing the removal of distal end 714 without the use of sufficient force. In this example, acute angle beta (β) is eighty degrees.

As shown in FIG. 21, distal end 714 includes a transition portion that tapers at acute angle delta (Δ) with respect to central axis 704. In this example, acute angle delta (Δ) is fifty-three degrees. The width of flexible strap 708 at the taper portion is approximately 11.68 mm, which is slightly less than the width of slots 724A, 724B, and 724C. In other embodiments, the width at the taper portion is between 10-15 mm. Locking teeth 722 are positioned before the transition portion and the width of flexible strap 708 is approximately 14.73 mm, which is larger than the width of a slot. In other embodiments, the width is between 12-20 mm. As a result, the taper of the transition portion can assist a user with pulling to secure locking teeth 722 in the slot.

As shown in FIG. 22, the width of slots 724A, 724B, and 724C is approximately 11.94 mm. In other embodiments, the width of the slots is between 10-15 mm. The height of slots 724A, 724B, and 724C is approximately 1.3 mm. In other embodiments, the height is between 0.5-3 mm. As noted above, in this embodiment slot 724A, slot 724B, and slot 724C are configured to secure channel nut holder 700 to a channel nut with a thickness of approximately 0.25 inches, 0.375 inches, and 0.50 inches, respectively. Therefore, the distance from the bottom of top portion 706 to the bottom of slot 724A is approximately 7.34 mm. In other embodiments, the distance is between 5-10 mm. In addition, the distance from the bottom of top portion 706 to the bottom of slot 724B is approximately 10.67 mm. In other embodiments, the distance is between 5-12 mm. Further, the distance from the bottom of top portion 706 to the bottom of slot 724C is approximately 13.72 mm. In other embodiments, the distance is between 10-15 mm. The distance of the slots can be adjusted for other thicknesses for channel nuts.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d*. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A channel nut holder comprising:

a polymer body having a central axis, a planar top surface, a plurality of side surfaces, and a bottom surface, wherein the plurality of side surfaces are positioned between the bottom surface and the planar top surface;

a channel nut opening positioned between the side surfaces;

a spring back mechanism having a plurality of gripping flaps disposed downwards at an acute angle alpha (a) with respect to the planar top surface, wherein each gripping flap extends along an entire length of the channel nut holder;

an opening disposed in the planar top surface and the plurality of gripping flaps, wherein the channel nut opening is configured to receive a channel nut, and wherein the opening disposed in the planar top surface and the plurality of gripping flaps is configured to provide access to the channel nut; and a pair of finger grips extending upwards from the planar top surface and spaced from the opening disposed in the planar top surface and the plurality of gripping flaps.

2. The channel nut holder of claim 1, wherein acute angle alpha (α) is six degrees.

3. The channel nut holder of claim 1, wherein the polymer body is formed of nylon.

4. The channel nut holder of claim 1, wherein the top surface and plurality of gripping flaps have a material thickness of 0.5 millimeters.

5. The channel nut holder of claim 1, further comprises: an opening on the bottom surface.

6. The channel nut holder of claim 5, wherein a length of the planar top surface extends beyond a diameter of the bottom surface.

7. The channel nut holder of claim 1, further comprising: at least one rib; and wherein the at least one rib is configured to secure to a groove of the channel nut.

8. The channel nut holder of claim 7, wherein the at least one rib has a material thickness of 0.5 millimeters.

9. The channel nut holder of claim 1, wherein each gripping flap includes a tab that extends along only a portion of the length of the channel nut holder.

10. The channel nut holder of claim 1, wherein acute angle alpha (α) is between six degrees and ten degrees.

11. A channel nut and holder assembly comprising:

a channel nut;

a channel nut holder including a polymer body having a central axis, a planar top surface, a plurality of side surfaces, and a bottom surface, wherein the plurality of side surfaces are positioned between the bottom surface and the planar top surface;

a channel nut opening disposed between the side surfaces, wherein the channel nut is inserted into the channel nut opening;

a spring back mechanism having a plurality of gripping flaps disposed downwards at an angle alpha (α) with respect to planar top surface, wherein each gripping flap extends along an entire length of the channel nut holder;

a second opening disposed in the planar top surface and the plurality of gripping flaps; and a pair of finger grips extending upwards from the planar top surface and spaced from the second opening.

12. The assembly of claim 11, wherein acute angle alpha (α) is six degrees.

13. The assembly of claim 11, wherein the polymer body is formed of nylon.

14. The assembly of claim 11, wherein the top surface and gripping flaps having a material thickness of 0.5 millimeters.

15. The assembly of claim 11, wherein the channel nut holder further comprises:

an opening on the bottom surface.

16. The assembly of claim 11, wherein the channel nut holder further comprises at least one rib configured to secure to a groove of the channel nut.

17. The assembly of claim 11, wherein each gripping flap includes a tab that extends along only a portion of the length of the channel nut holder.

18. The channel nut holder of claim 11, wherein acute angle alpha (α) is between six degrees and ten degrees.

* * * * *